(12) United States Patent
Teng et al.

(10) Patent No.: US 9,177,393 B2
(45) Date of Patent: Nov. 3, 2015

(54) MIXED MODE FOR FRAME BUFFER COMPRESSION

(71) Applicant: QUALCOMM Incorporated, San Diego, CA (US)

(72) Inventors: Chia-Yuan Teng, San Diego, CA (US); Natan Haim Jacobson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 14/170,456

(22) Filed: Jan. 31, 2014

(65) Prior Publication Data

US 2014/0219558 A1    Aug. 7, 2014

Related U.S. Application Data

(60) Provisional application No. 61/760,466, filed on Feb. 4, 2013.

(51) Int. Cl.
*G06K 9/36* (2006.01)
*G06T 9/00* (2006.01)
(Continued)

(52) U.S. Cl.
CPC *G06T 9/00* (2013.01); *H04N 19/11* (2014.11); *H04N 19/14* (2014.11); *H04N 19/186* (2014.11); *H04N 19/124* (2014.11); *H04N 19/46* (2014.11); *H04N 19/70* (2014.11)

(58) Field of Classification Search
CPC ........... G06T 9/00; G06T 9/005; G06T 7/408; G06K 9/4652; G06K 9/00664; H04N 1/64
See application file for complete search history.

(56) References Cited

U.S. PATENT DOCUMENTS 5,463,701 A   10/1995   Kantner, Jr. et al.
5,930,387 A   7/1999    Chan et al.
(Continued)

FOREIGN PATENT DOCUMENTS

EP          1079635 A1       2/2001
EP          2265029 A1      12/2010
WO     WO-2013006370 A1     1/2013

OTHER PUBLICATIONS

Chaddha, N., et al., "Text segmentation in mixed-mode images", Signals, Systems and Computers, 1994. 1994 Conference Record of the Twenty-Eighth ASILOMAR Conference on Pacific Grove, CA, USA Oct. 31, 1994, pp. 1356-1361, XP010148798.

(Continued)

*Primary Examiner* — Amir Alavi
(74) *Attorney, Agent, or Firm* — Knobbe, Martens, Olson & Bear LLP

(57) ABSTRACT

Certain aspects relate to systems and techniques for compressing image data using mixed mode compression schemes. A mixed mode compression scheme can reduce the amount of data stored in a frame buffer to reduce power costs of an image display system. In some implementations, mixed mode compression can be suitable for compression of pixel blocks having one or two color channels exhibiting a relatively low variation in pixel intensity with the remaining channel or channels exhibiting a relatively high variation. The pixel values in each color channel of an RGB or $YC_oC_g$ image can be analyzed to determine how many channels are a smooth component and how many channels are a variant component, and mixed mode compression can be selected and implemented based on the color channel analysis to adaptively and individually compress the color channels.

30 Claims, 8 Drawing Sheets

(51) Int. Cl.
*H04N 19/11* (2014.01)
*H04N 19/14* (2014.01)
*H04N 19/186* (2014.01)
H04N 19/70 (2014.01)
H04N 19/46 (2014.01)
H04N 19/124 (2014.01)

(56) References Cited

U.S. PATENT DOCUMENTS

| | | | |
|---|---|---|---|
| 6,320,981 B1* | 11/2001 | Yada | 382/168 |
| 6,625,323 B2* | 9/2003 | Henderson et al. | 382/251 |
| 7,039,241 B1 | 5/2006 | Van Hook | |
| 7,085,420 B2* | 8/2006 | Mehrotra | 382/232 |
| 7,668,382 B2* | 2/2010 | Wu et al. | 382/232 |
| 8,243,340 B2 | 8/2012 | McDowell et al. | |
| 8,351,699 B2* | 1/2013 | Li et al. | 382/172 |
| 2003/0012446 A1 | 1/2003 | Thomas et al. | |
| 2004/0062445 A1 | 4/2004 | Kim et al. | |
| 2009/0148059 A1 | 6/2009 | Matsuda | |
| 2009/0245630 A1 | 10/2009 | Johnston | |
| 2010/0046628 A1 | 2/2010 | Bhaskaran et al. | |
| 2010/0128286 A1 | 5/2010 | Amir et al. | |
| 2012/0275697 A1 | 11/2012 | McDowell et al. | |
| 2013/0010864 A1 | 1/2013 | Teng | |
| 2014/0219558 A1* | 8/2014 | Teng et al. | 382/166 |
| 2014/0219573 A1 | 8/2014 | Teng et al. | |

OTHER PUBLICATIONS

Chen, J., et al., "Adaptive linear prediction for block-based lossy image coding", Image Processing (ICIP), 2009 16th IEEE International Conference on, IEEE, Piscataway, NJ, USA, Nov. 7, 2009, pp. 2833-2836, XP031629140.

International Search Report and Written Opinion—PCT/US2014/014488—ISA/EPO—Apr. 17, 2014.

Jeon (LG) B et al, "Video coding technology proposal by LG Electronics", 1. JCT-VC Meeting; Apr. 15, 2010-Apr. 23, 2010; DRESDEN; (Joint Collaborative Team on Video Coding of ISO/IEC JCT1/SC29/WG11 and ITU-TSG.16); URL:http://wftp3.itu.int/av-arch/jctvc-site/ Apr. 13, 2010, XP030007545, pp. 1-35.

Li, G., et al., "Integration of Plane Mode with Multiple Predictor Sets in Intra Prediction for video coding", Circuits and Systems (ISCAS), 2011 IEEE International Symposium on, IEEE, May 15, 2011, pp. 617-620, XP031997707.

Written Opinion—PCT/US2014/014488—IPEA/EPO—Feb. 3, 2015.

* cited by examiner

MIXED MODE FOR FRAME BUFFER COMPRESSION

CROSS-REFERENCE TO RELATED APPLICATIONS

The present application claims the benefit under 35 U.S.C. §119(e) of U.S. Provisional Patent Application No. 61/760,466, filed on Feb. 4, 2013, entitled "MIXED COMPRESSION MODE FOR VISUALLY-LOSSLESS LOW-COMPLEXITY FRAME BUFFER COMPRESSION," the contents of which is hereby incorporated by reference herein in its entirety and for all purposes. The present application is related to U.S. patent application Ser. No. 14/170,463, filed Jan. 31, 2014, entitled "PATTERN MODE FOR FRAME BUFFER COMPRESSION."

TECHNICAL FIELD

The systems and methods disclosed herein are directed to image data, and, more particularly, to the compression of image data.

BACKGROUND

Even handheld computing devices such as mobile phones and tablets now demand high-resolution, high-color displays, thus requiring high-wattage backlight lamps and large-capacity frame buffer memories which together lead to high power consumption. The frame buffer, the area of memory that stores fragments of data during rasterization of an image on a display, is a big consumer of both memory bandwidth and storage space, and this can adversely impact the memory subsystem of a graphics processing unit (GPU). In addition, together with the display backlight, frame buffers consume a significant percentage of a device's power. Particularly in mobile devices with limited battery life, frame buffer power consumption can present significant challenges in light of the high refresh rate, resolution, and color depth of displays. Thus, reducing frame buffer activity helps to extend overall battery life.

Accordingly, frame buffer compression (FBC) is becoming increasingly popular for rendering images on the displays of high-resolution mobile phone and tablet devices. This applies both to regular panels, where FBC can reduce the required link rate, as well as to smart panels, where FBC can reduce both the link rate and panel memory requirement, saving cost. Some approaches to FBC can reduce the number of accesses to the frame buffer, thereby reducing power costs. The power consumption of the frame buffer and its associated buses is proportional to the number of frame buffer accesses during rasterization. The number of accesses is in turn determined by the screen resolution, the refresh rate, and the color depth. Power consumption of the frame buffer is also inversely proportional to the compression ratio.

As display size and resolution continues to increase, there is increased demand for higher compression ratios in frame buffer compression. Even as the demands on compression FBC techniques increase, the requirements of FBC continue to be (1) low-complexity, in that the driver integrated circuit of the mobile device can implement compression and decompression with limited computational resources, (2) visually lossless quality, in that the user should not see any visual degradation in the image due to compression and decompression, and (3) a fixed compression rate.

SUMMARY

In general, this disclosure is related to techniques for data compression so that the amount of data that needs to be stored in a frame buffer or transmitted is reduced. Some embodiments relate to systems and techniques for compression of certain image blocks, referred to herein as "mixed mode" or "mixed mode compression," where the image blocks contain one or two color channels exhibit a relatively low variation in pixel intensity, while the remaining channel or channels exhibit a relatively high variation. Such pixel blocks may be very difficult to compress while maintaining high visual quality using existing methods. For example, using prediction to compress highly-varying color channels can produce too large of a bitstream, and using quantization to compress low-varying or mildly-varying channels can produce poor image quality. Using mixed mode can provide lossless or substantially lossless coding at a high compression ratio, reducing the activity of the frame buffer and associated buses during rasterization and therefore also reducing power consumption without sacrificing visual quality. In addition, mixed mode can be adapted to function in either the RGB or $YC_oC_g$ color spaces depending on the image data. Mixed mode can be used either independently or along with other components as part of a frame buffer compression algorithm. Some embodiments can relate to criterion for selecting mixed mode over other compression modes in the case of mixed mode compression being used in conjunction with other types of compression modes.

Mixed mode has many advantages over existing FBC techniques regarding quality as well as efficiency and corresponding memory and power consumption. For example, mixed mode can provide high visual quality compression for blocks which are otherwise difficult to compress. Mixed mode compression can achieve lossless or near-lossless performance for natural image data or graphics data wherein one or two color channels exhibit a relatively low variation in pixel intensity, while the remaining channel or channels exhibit a relatively high variation. An end user may not be able to see any visual degradation in image data rendered from data coded using mixed compression. In addition, mixed mode is block based, processing only on N-pixel array, resulting in almost no delay. Further, mixed mode can guarantee a fixed compression rate, which is beneficial for a panel with a fixed memory size. As described hereinbelow, mixed mode compression can be done in one pass and does not involve any recursion, and is therefore efficient for small data, due to the avoidance of repeated function calls and returns. In addition, mixed mode provides support for both lossless and lossy compression by enabling and disabling a quantization based on the number of highly varying components. Other advantages include that mixed mode does not require a line buffer and that it requires low computational complexity, as only the operators "+", "<<", and ">>" are used with no multiplication and no division. As well, mixed mode may not require the use of a line buffer.

One aspect relates to a system in an electronic device for compressing image data, the system comprising a channel analysis module configured to receive a pixel block comprising a plurality of components, at least some of the plurality of components corresponding to a color channel of the pixel block; determine whether the pixel block is a mixed block by comparing values associated with each of the plurality of components to at least one threshold and assigning a classification of either smooth or variant to at least some of the plurality of components based on the at least one threshold, a mixed block being a pixel block having at least one component assigned the smooth classification, and all of the plurality of components in the mixed block assigned the classification of either smooth or variant; and a mixed mode compression module configured to compress the pixel block using mixed encoding based at least partly on the assigned component classifications.

Another aspect relates to a method for compressing image data in an electronic device, the method comprising receiving a pixel block comprising a plurality of components, wherein at least some of the plurality of components corresponding to a color channel of the pixel block; comparing values associated with each of the plurality of components to at least one of a high threshold and a low threshold to determine a level of color variance in each of the plurality of components; assigning a classification of smooth to at least one smooth component of the plurality of components, the value associated with the at least one smooth component being less than the low threshold; assigning a classification of variant to at least one variant component of the plurality of components; the value of associated with the at least one variant component being higher than the high threshold; and determining whether the pixel block is a mixed block based on the assigned classifications.

Another aspect relates to an apparatus for compressing image data in an electronic device, the apparatus comprising means for determining level of color variance in each of a plurality of components of a pixel block by comparing values associated with each of the plurality of components to at least one of a high threshold and a low threshold; means for assigning a classification of smooth to at least one smooth component of the plurality of components and assigning a classification of variant to at least one variant component, the value associated with the at least one smooth component being less than the low threshold and the value associated with the at least one variant component being greater than the high threshold; and means for determining whether the pixel block is a mixed block based on the assigned classifications.

Another aspect relates to a non-transitory computer-readable medium storing instructions that, when executed, cause at least one physical computer processor to perform a method of compressing image data, the method comprising determining level of color variance in each of a plurality of components of a pixel block by comparing values associated with each of the plurality of components to at least one of a high threshold and a low threshold; assigning a classification of either smooth or variant to at least some of the plurality of components based on the compared values; determining whether the pixel block is a mixed block based on the assigned classifications; and implementing different compression modes for at least one component assigned the smooth classification and at least one component assigned the variant classification.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Figure 1:
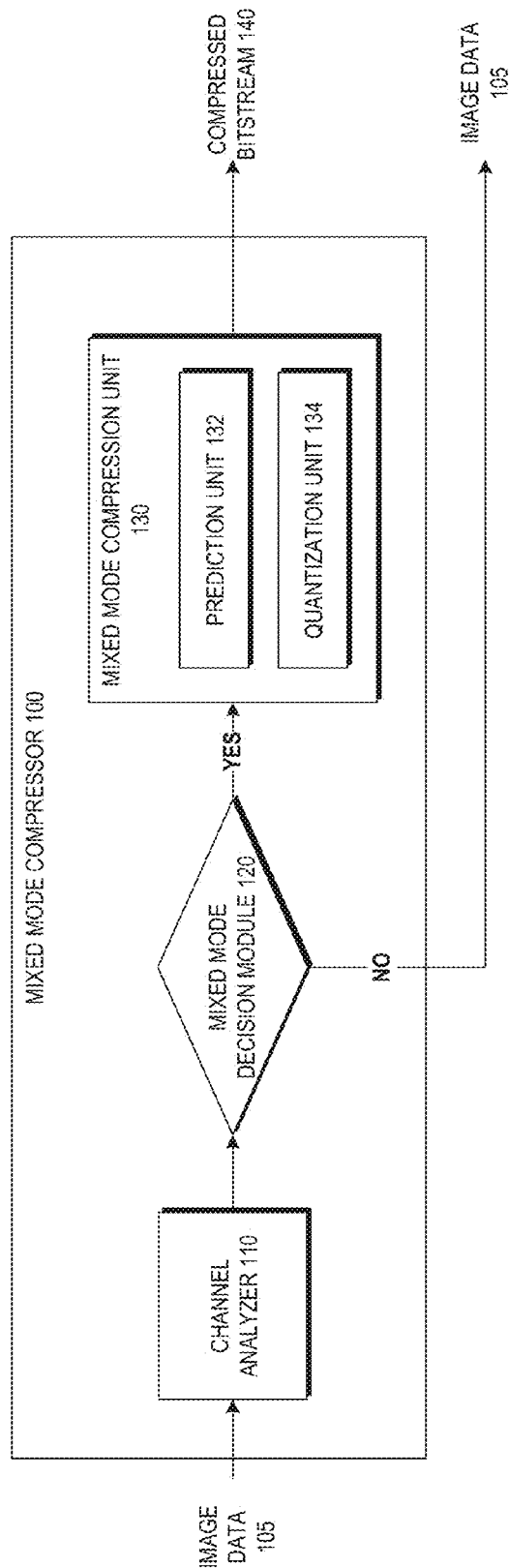
FIG. 1 illustrates a schematic block diagram of an embodiment of a mixed mode compression system.

Embodiments of the disclosure relate to techniques for compression of image data or other graphical data in a frame buffer. The mixed mode compression scheme disclosed herein is useful for coding graphics content which contains one or two color channels exhibiting a relatively low variation in pixel intensity with the remaining channel or channels exhibiting a relatively high variation. One example of the mixed mode compression scheme includes three main steps: first, analyzing the pixel values in each color channel of an RGB or $YC_oC_g$ image to determine how many channels are a smooth component and how many channels are a variant component, second, determining if and how mixed mode compression should be used based on the channel analysis, and third, mixed coding to adaptively and individually compress the color channels based on the channel analysis. By compressing the data, the techniques described in this disclosure may reduce the amount of data that needs to be stored in a frame buffer and/or reduce the amount of data that needs to be transmitted. In other words, without compression the amount of data that needs to be stored in the frame buffer and/or transmitted may be greater than the amount of data that needs to be stored in the frame buffer and/or transmitted with compression, leading to larger delay times and higher power consumption.

As a few examples, image frames may be pictures of video content composed by a video decoder, graphics content composed by a graphics processing unit (GPU), or images captured by a camera and composed by a camera processor. In general, an image frame may be any example of image content that is to be displayed on a display including the results of executing applications that generate viewable content such as web browsers, games, media players, and the like.

A compression unit, including a mixed mode compression module, may receive the pixel values for pixels of the composed image frame from any one of the video decoder, GPU, and camera processor. Each of the pixel values may be represented by a plurality of data bits. For instance, one example of the pixel values may be color values that include data bits for red, green, and blue (RGB) components. In another example, pixel values can be color values in the $YC_oC_g$ color space including data bits for luminance, orange chrominance, and green chrominance components. The compression unit may receive the data bits of the pixel values for each of the pixels in the image frame, and apply compression so that fewer bits are needed to represent the color value of each pixel. The compression unit may similarly compress other types of pixel values such as opacity values and coordinates, as two examples. As used in this disclosure, the term "image data" may refer generally to bits of the pixel values, and the term "compressed image data" may refer to the output of the compression unit after compression unit compresses the image data. For example, the number of bits in the compressed image data may be less than the number of bits in the image data. In some embodiments, the compression unit may receive the pixel values in blocks, and "image data" may refer to blocks of pixels of the original image.

To compress the image data, the compression unit may implement a mixed mode compression scheme. The compression unit may implement the mixed mode compression scheme to the entirety of the image frame, a slice of the image frame, block-by-block, or line-by-line. As described in more detail, in accordance with the mixed mode compression scheme, the compression unit may conduct a channel analysis to classify each component of a pixel block based on the sum of absolute differences of the component in order to achieve the target compression. The sum of absolute differences can be used to determine a color space of the image data and also a level of color variance of the component.

In one example, each component or color channel of a pixel block can be analyzed by the compression unit, where the components are the color channels in either the RGB (red, green, blue) or $YC_oC_g$ (pseudo-luminance, orange chrominance, green chrominance) color spaces. The mixed mode compression scheme can be adapted to other color spaces in other embodiments. The mixed mode compression scheme can use the pixel values to classify each of the components in a block as smooth (low-variant), variant (high-variant), or unclassified to determine if the block is a candidate for mixed mode compression. A block can be a candidate for mixed mode compression if all components are either smooth or variant and at least one channel is smooth. If the block is not a candidate for mixed mode compression, some other method, such as 1D or 2D prediction or pulse code modulation (PCM) may be used to encode the block. If the component classifications indicate that the block is a good candidate for mixed mode compression, then each component of the block can be coded individually based on their variation. In some embodiments, variation can be calculated by the absolute value of the error of a differential pulse-code modulation predictor over the pixels within each block component in some embodiments, or by calculating the sum of absolute differences over the pixel values in each component of the block. In some embodiments, smooth components can be compressed using prediction or skip mode, and variant components can be coded using direct quantization. As such, mixed mode compression allows for a high compression ratio due to individual and adaptive coding of the block components based on variation.

In some examples, the compression unit may compress the image data utilizing various compression techniques including mixed mode, among others. The compression unit may determine which type compression technique should be applied to the image data, and compress the image data based on the determined compression technique.

Overview of Mixed Mode Compression

FIG. 1 illustrates a schematic block diagram of an embodiment of a mixed mode compressor 100 including a channel analyzer 110, mixed mode decision module 120, and mixed mode compression unit 130. The mixed mode compression unit 130 can include a prediction unit 132 and a quantization unit 134. In some embodiments, the channel analyzer 110 and mixed mode decision module 120 can be combined into a single module.

Image data 105 can be input into the channel analyzer 110 of the mixed mode compressor 100 to calculate the variation of each component of the image data 105 for an initial determination of whether to code the image data 105 according to mixed mode. In some embodiments, mixed mode compressor 100 can separate image data 105 into blocks of pixels. In other embodiments, the image data 105 can be segmented into blocks prior to transmission to the mixed mode compressor 100. For purposes of illustration, the embodiments discussed herein use image blocks of the size 8×1 pixels, however in other embodiments other block sizes can be used.

Channel analyzer 110 can analyze the pixel values of each color channel or component in the block, where each component corresponds to the channels of the RGB or $YC_oC_g$ color spaces in some examples. The channel analyzer 110 can use the pixel values to calculate the variation of each color channel and to classify each color channel based on the calculated variation. For example, in one embodiment the sum of absolute differences (SAD) can be calculated to determine whether the three components of each block are in the RGB or $YC_oC_g$ color space, as the sum of the SAD of all components of an RGB image or image block is less than the sum of the SAD of all components of a $YC_oC_g$ image or image block. In some embodiments, the channel analyzer 110 may only perform the calculations to determine the color space of one block of per captured image, and all other blocks in the image can be assumed within the same color space. In other embodiments the channel analyzer 110 may perform the calculations to determine the color space for some or all blocks in a captured image.

Still referring to FIG. 1, the channel analyzer 110 can use the SAD of each component to classify the component as one of a smooth component, variant component, or an unclassified component. The sum of absolute differences can indicate a level of color variance of the component. For example, the channel analyzer 110 can compare the SAD of a component to both a low threshold and a high threshold. In this example, the component can be classified as a smooth component if the SAD is below the low threshold, can be classified as a variant component if the SAD exceeds the high threshold, and can be unclassified if the SAD is between the low and high thresholds. Channel analyzer 110 can build a classification database indicating the number of smooth, variant, and unclassified components in a block. This channel classification data can be stored in a frame buffer in some embodiments.

The mixed mode decision module 120 can analyze the channel classification data to determine whether the block is a suitable candidate for mixed mode compression. In some embodiments, a block can be a candidate for mixed mode compression if all components are either smooth or variant, that is, no component was unclassified, and if at least one channel is smooth. Accordingly, if any component is unclassified or if no component is smooth, then the mixed mode decision module 120 can determine that the block is not a suitable candidate for mixed mode compression. If the mixed mode decision module 120 determines that the block is not suitable for mixed mode compression, then the image data 105 can be output for compression using some other technique and the next block can be analyzed by the mixed mode compressor 100. Accordingly, in some examples, some blocks in the image data 105 can be coded using mixed mode, while other blocks can be coded using other techniques. If the mixed mode decision module 120 determines that the block is suitable for mixed mode compression, then the image data and channel classification data can be transmitted to the mixed mode compression unit 130 for coding.

Mixed mode compression unit 130 can compress pixel values of smooth components using the prediction unit 132. Prediction unit 132 can apply predictive coding to the smooth component or components, and various forms of predictive coding are either lossless or lossy. Prediction unit 132 can apply either skip mode or differential pulse code modulation to the pixel values of the smooth component based on the value of the low threshold discussed above. Differential pulse-code modulation is a lossy form of image compression that encodes a difference value between the actual value of a pixel and a predicted value of the pixel, usually derived from one or more previous values. The difference values can be quantized. The difference values can be used to generate reconstructed values on the basis of the predicted values. In one example, if the low threshold is 1, then prediction unit 132 can compress the smooth component using skip mode. Skip mode is a predictive coding technique for encoding a current pixel in a block based on whether the current pixel is identical or similar to a neighboring pixel in the block. Identical or similar pixels can be skipped along with providing an indication of the number of skipped pixels.

Mixed mode compression unit 130 can compress pixel values of the variant components using the quantization unit 134. Quantization is a lossy compression technique achieved by compressing a range of values to a single quantum value. When the number of discrete symbols in a given bitstream is reduced, the resulting bitstream is shorter than the original bitstream. Accordingly, compression through quantization seeks to make small quality compromises in ways that are intended to be minimally perceptible in order to reduce the amount of data. In one embodiment, if the channel classification data indicates that the block includes more than one variant component, then the quantization unit 134 can compress the variant components using quantization with a quantization parameter (QP) of 1-bit. If the channel classification data indicates that the block includes only one variant component, then the quantization unit 134 can compress the variant component using quantization with a QP of 0-bits. The QP regulates how much spatial detail is saved during compression of a component. When the QP is zero or small, all or almost all of the original detail is retained during compression. As QP is increased, some of that detail is aggregated so that the bit rate drops, producing a more compressed bitstream but at the price of some increase in distortion and some loss of quality. As the human vision is more sensitive to small variations in luminance compared to small variations in chrominance, further compression can be obtained in a non-RGB color space which quantizes chrominance components (e.g., $C_g$ and $C_o$) with a higher QP than luminance components (Y). By adaptively selecting the QP based on the block composition, the compression unit 130 can support both lossless and lossy compression of the block. For example, a maximum number of bits can be determined for a bitstream representing the compressed block. If the block has one variant component and two smooth components, then compression unit 130 may be able to losslessly encode the block using the maximum number of bits or less. If the block has two variant components and one smooth component, then the compression unit 130 can quantize the two variant components in order to produce a bitstream of the maximum number of bits or less. Although mathematically lossy, the mixed mode compression in this example can still produce visually lossless compressed image data.

The mixed mode compression unit 130 can also generate a bitstream including the coded components and other information about the pixel block and/or coding process. In one example, a mixed mode header can be configured as required by the overall encoder/decoder design, and the first field after the header can indicate the color space of the block. Next, 1-bit code can indicate whether each component in the block is smooth or variant. Finally, the coded component values can be encoded in a 0-64 bit field. Further details regarding coding image data in mixed mode are discussed with respect to FIG. 4. The compressed bitstream 140 can be transmitted for storage in a frame buffer in some embodiments.

The illustrated example mixed mode compression scheme is provided for explanatory purposes, and it will be understood that different block sizes, block values, number of components, type of component, and thresholds are possible in other examples. In addition, embodiments may include types of coding suitable for other component types based on the encoding needs of the system.

System Overview

Figure 2A:
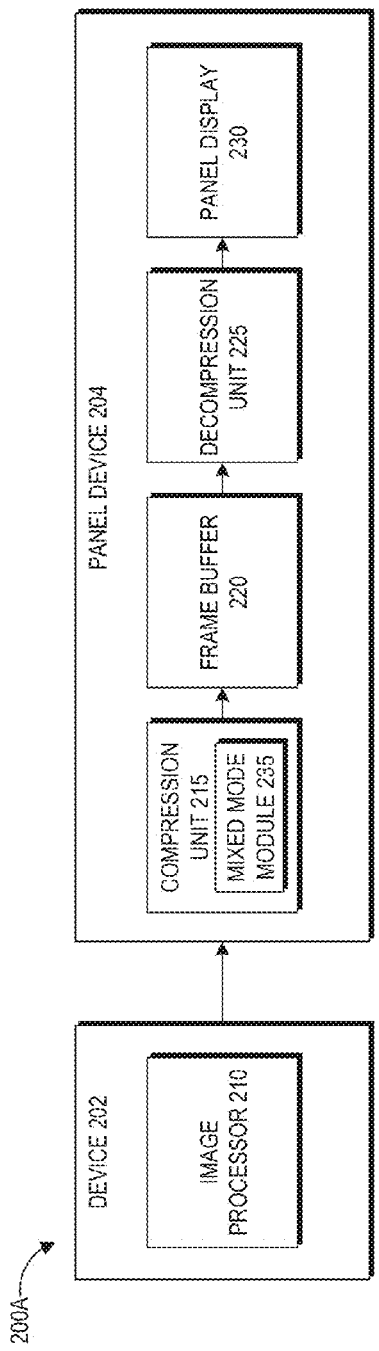
FIGS. 2A-2C illustrate schematic block diagrams of example systems that can implement the compression techniques described in this disclosure.
Figure 2B:
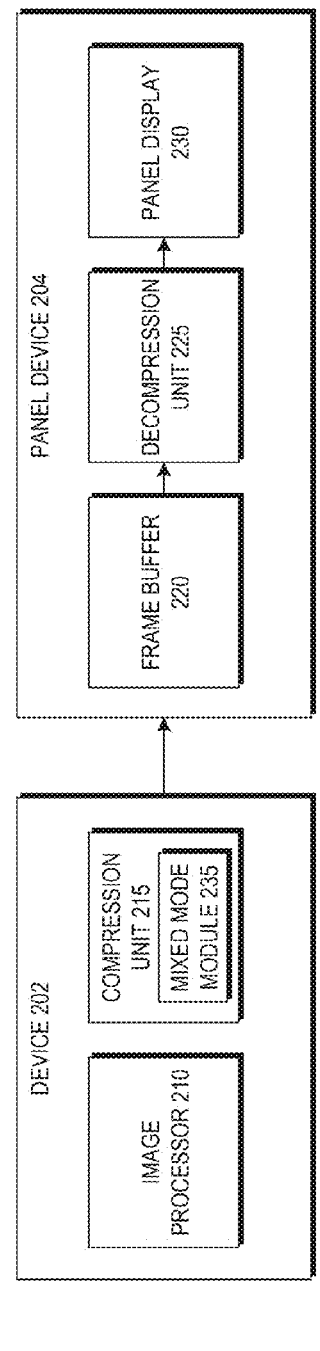
Figure 2C:
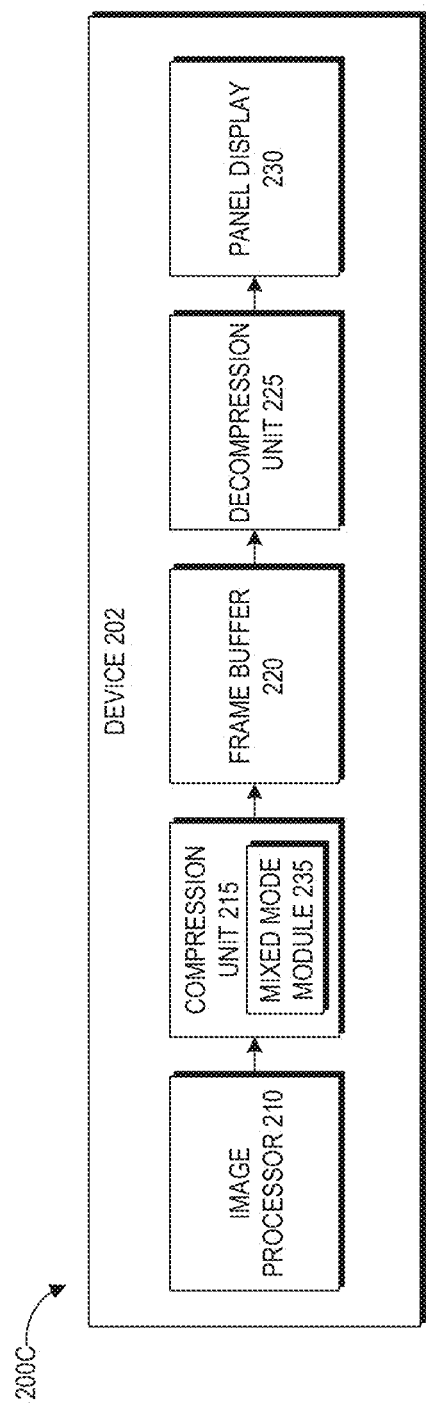

FIGS. 2A-2C illustrate schematic block diagrams of example systems that can implement the compression techniques described in this disclosure. For instance, FIGS. 2A-2C illustrate systems 200A-200C, respectively. In FIG. 2A and FIG. 2B, systems 200A and 200B include device 202 and external panel device 204, and in FIG. 2C, system 200C includes device 202 without an external panel device 204. Together, device 202 and panel device 204 include components such as the image processor 210, compression unit 215, frame buffer 220, decompression unit 225, and panel display 230. The compression unit 215 can include mixed mode module 235.

Examples of device 202 include, but are not limited to, mobile computing devices such as cell phones, digital cameras, tablet computers, media players, personal digital assistant, wireless handset, gaming console, or the like. Device 202 may also be a more stationary device such as a desktop personal computer, video conferencing station, set-top box, or the like. Examples of the panel device 204 include, but are not limited to, televisions, monitors, liquid crystal displays (LCDs), light-emitting diode displays (LEDs), organic LEDs (OLEDs), plasma displays, display screens of any of the video devices mentioned above, or generally any device that displays images.

In systems 200A-200C, device 202 includes image processor 210. Image processor 210 may be any component that generates a fully composed image frame. An image frame may be any viewable content that is to be displayed including the results of executing applications that generate viewable content. For instance, examples of image processor 210 include, but are not limited to, any one or more of a video decoder, a graphics processing units (GPU), and a camera processor. Examples of image frames include, but are not limited to, any one or more of a picture of video content composed by the video decoder, graphics content composed by the GPU, or an image captured by a camera and composed by the camera processor.

An image frame may include pixel values for a plurality of pixels. For instance, the image frame in one embodiment may be represented by a two-dimensional array of pixel values, where each pixel value may correspond to one pixel of panel display 230. For example, panel display 230 in systems 200A, 200B, and 200C may display the image frame, and panel display 230 may illuminate its pixels based on the corresponding pixel values of the image frame.

The pixel values of the image frame may be defined by a plurality of digital bits. Pixel values can be, for example, brightness values or color values. Color values are generally defined by red, green, and blue (RGB) components or intensity, orange chrominance, and green chrominance ($YC_oC_g$) although other color spaces can also be used. Image processor 210 may similarly represent other examples of pixel values such as luminance values, transparency values, opacity values, and pixel coordinates with digital bits. For purposes of illustration and ease of description, the techniques described in this disclosure are described in context of the color values that are represented by RGB and $YC_oC_g$ components. However, aspects of this disclosure are not limited to processing RGB and $YC_oC_g$ pixels, and the techniques described herein may be extended to examples where other color spaces are used or where other pixel values are used to separate a block into components.

The image processor 210 may transmit the pixel values to compression unit 215. In the example of FIG. 2A, compression unit 215 may reside within the external panel device 204, and in the examples of FIGS. 2B and 2C, compression unit 215 may reside within device 202. In the examples of FIGS. 2A-2C, although compression unit 215 is illustrated as being external to image processor 210, in other examples, compression unit 215 may be a part of image processor 210.

In the example of FIGS. 2A and 2B, device 202 and external panel device 204 may be coupled wirelessly or with a wired link that may be used to transmit data from the image processor 210 to the compression unit 215. As one example of the wired link, device 202 and external panel device 204 may be coupled by a High Definition Multimedia Interface (HDMI) cable. In the examples of FIGS. 2B and 2C, image processor 210 can transmit the pixel values to compression unit 214 via a system bus of device 202 that interconnects the various components of device 202. In examples where the image processor includes the compression unit, the image processor can transmit the pixel values to the compression unit without requiring the system bus.

Compression unit 215 can be configured to receive the pixel values generated by image processor 210 and can include instructions to apply compression. As described above, the pixel values may be a plurality of bits that represent the color. Compression unit 215 may apply compression so that fewer bits are needed to represent the color. As an example, one pixel value can be 24 bits (8 bits each for R, G, and B components); therefore, a block of eight pixel values is 192 bits. In this example, if 50% compression is desired, compression unit 215 receives the 192 bits and applies compression to reduce the total number of bits to 96 bits. To compress the image data, compression unit 215 may implement a mixed mode compression scheme using mixed mode module 235 on blocks of the image data, as discussed in more detail above and below. As an example, one block of image data may be eight pixel values; however, in other embodiments a block can be fewer or greater than eight pixels.

Using the mixed mode module 235, compression unit 215 may achieve true real time (or near real time) compression. For example, mixed mode module 235 can be able to compress the image data in a single pass, rather than requiring multiple passes. In other words, as soon as mixed mode module 235 compresses an image data block, the bits of the compressed image data block may be transmitted or stored immediately. Furthermore, compression unit 215 may not require large blocks of memory for compression. For instance, it is possible to reduce the size of the frame buffer 220 with mixed mode module 235. In addition, the mixed mode compression scheme implemented by mixed mode module 235 does not require extensive memory for storage, and accordingly the mixed mode compression techniques do not negate any reduction in size of frame buffer 220 achieved by mixed mode module 235. Examples of compression unit 215 include, but are not limited to, any of a variety or general purpose or special purpose processing hardware, such as a digital signal processor (DSP), a general purpose microprocessor, application specific integrated circuit (ASIC), field programmable logic array (FPGA), or other equivalent integrated or discrete logic circuitry.

Compression unit 215 can include instructions to output the compressed image data to frame buffer 220, which can store the compressed image data. An example of frame buffer 220 is random access memory (RAM); however, other types of memory may be possible. By compressing the image data prior to storage in frame buffer 220, the techniques of this disclosure may allow for a reduction in the size of frame buffer 220. In general, the cost of frame buffer 220 is proportional to its size. Accordingly, by compressing the image data with compression unit 215, the cost and size of frame buffer 220 can be reduced compared to examples where no compression is applied. Compression of the image data can also improve bandwidth efficiency for transfer of the image data.

Decompression unit 225 can include instructions to decompress the compressed image data to reconstruct an image that is substantially similar to the original, uncompressed image. For example, the output of decompression unit 225 may be pixel values that are the same as or substantially similar to the pixel values of the image frame that image processor 210 composed. To decompress the compressed image data, decompression unit 225 may apply the inverse of the compression scheme applied by compression unit 215. In some embodiments, compression unit 215 may provide an indication to the decompression unit 225 regarding the manner in which the image data was compressed, which allows decompression unit 225 to determine the appropriate manner in which to decompress the compressed image data. The compression unit 215 may apply either lossless or lossy compression. With lossless compression, decompression unit 220 may be able to decompress the compressed image data such that the resulting image data is virtually identical to the original image data. With lossy compression, decompression unit 225 may not be able to decompress the compressed image data such that the resulting image data is identical to the original image data. However, even with lossy compression, the decompressed image data may be similar, and potentially substantially similar, to the original image data.

Panel 230 may be any type of display. For instance, examples of panel 230 include, but are not limited to, a liquid crystal display (LCD), a light-emitting diode display (LED), an organic light emitting diode display (OLED), a cathode ray tube (CRT) display, a plasma display, or another type of display device. Panel 230 may include a plurality of pixels that are illuminated to display the viewable content of the image frame composed by image processor 210. The pixel values outputted by decompression unit 225 can indicate the manner in which the pixels of panel 230 are to be illuminated. Although not illustrated, in some embodiments, decompression unit 225 may be coupled to a display processor, and the display processor may be coupled panel 230. In these embodiments, the display processor may determine the voltage that is to be applied to the pixels of panel 230 so that, when illuminated, the pixels present the desired color. In the examples of FIGS. 2A and 2B, the components of external panel device 204, excluding panel 230, may be considered as a driver for panel 230.

Overview of Example Channel Analyzer

Figure 3:
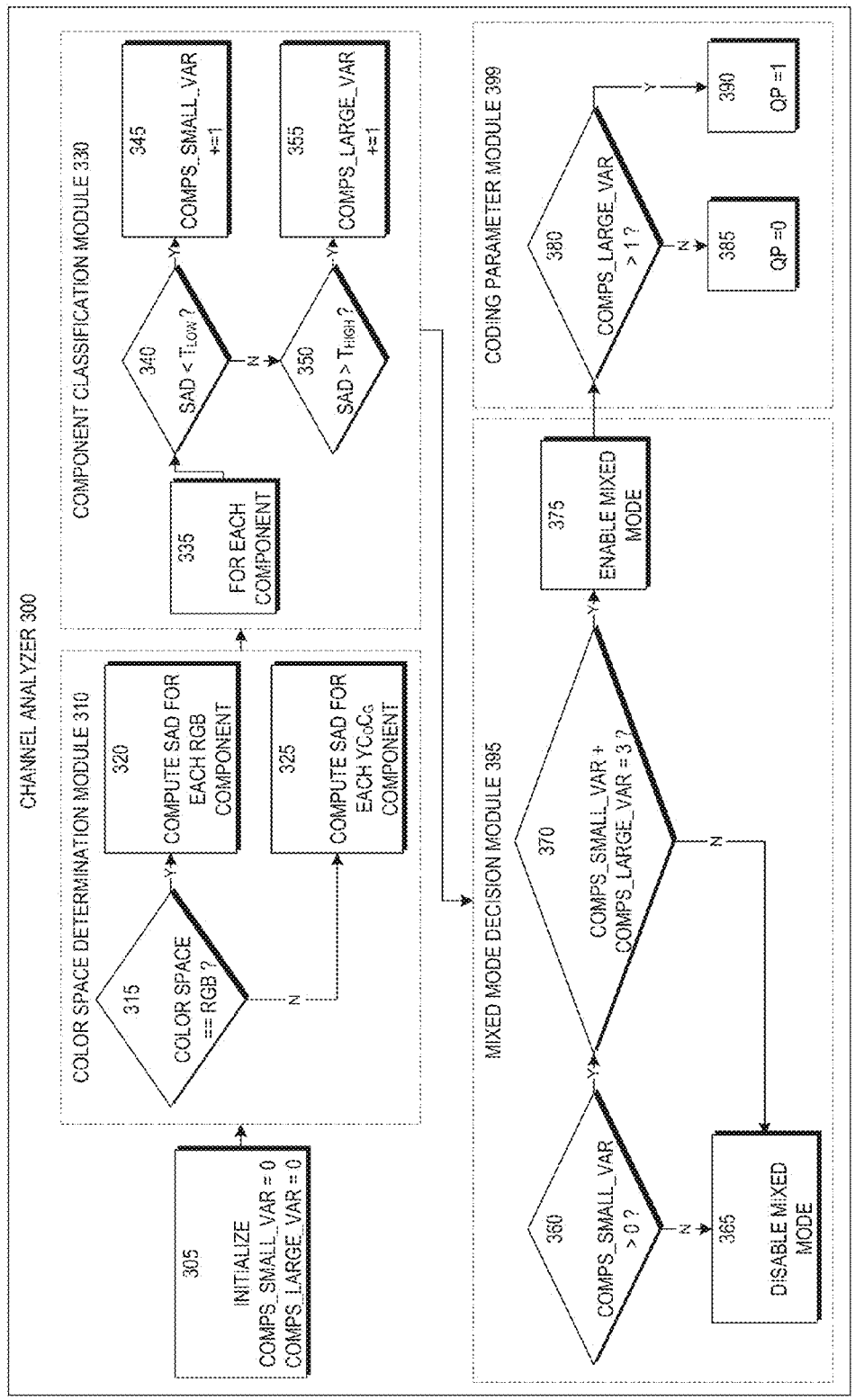
FIG. 3 illustrates an example of a channel analysis module.

FIG. 3 illustrates an example of a channel analyzer 300 that can be implemented as part of the mixed mode compression scheme described herein. As discussed above, one example of the channel analysis can compare sum of absolute difference (SAD) values of each component of a block to high and low thresholds to classify the channels as one of smooth, variant, or unclassified. The channel analyzer 300 can be implemented in the mixed mode compressor 100 of FIG. 1, and can be implemented in the mixed mode module 235 of the compression unit 215 of FIGS. 2A-2C.

The channel analyzer 300 can include an initialization module 305 in data communication with a color space determination module 310. The color space determination module 310 can determine whether the color space of the image block is RGB or $YC_oC_g$ in the illustrated example, and can be in data communication with a component classification module 330. Component classification module 330 can determine whether each of the components of the image block is a smooth component, a variant component, or an unclassified component, and can be in data communication with a mixed mode decision module 395. The mixed mode decision module 395 can receive component classification data output by the component classification module 330 and can use the component classification data to determine whether to enable or disable mixed mode compression for the current block. The mixed mode decision module 395 can be in data communication with a coding parameter module 399, such that if the block is suitable for mixed mode compression then the coding parameter module 399 can receive the component classification data from the mixed mode decision module 395 and can set coding parameters based on the component classification data.

The channel analyzer 300 can receive a block or blocks of image data for analysis. In this example, prior to analyzing the block components (i.e., color channels in the RGB and $YC_oC_g$ examples) of the block, the initialization module 305 can set the number of component with a low degree of variation ("smooth component") and the number of component with a high degree of variation ("variant component") to zero. The color space determination module 310 can then analyze the block at decision module 315 to determine whether the color space of the block is RGB or $YC_oC_g$ according to Equation (1) below.

$$CSC = \begin{cases} RGB, & SAD(R) + SAD(G) + SAD(B) < SAD(Y) + \\ & SAD(C_0) + SAD(C_g) \\ YC_0C_g, & \text{else} \end{cases} \quad (1)$$

The color space calculation CSC embodiment of Equation (1) uses the sum of absolute differences (SAD) metric to determine whether the three components of the block are in the RGB or $YC_oC_g$ color space. The SAD of each component is added, and if SAD sum of the R, G, and B components is less than the SAD sum of the Y, $C_o$, and $C_g$ components then the color space of the block is RGB. If the SAD sum of the R, G, and B components is equal to or greater than the SAD sum of the Y, $C_o$, and $C_g$ components then the color space of the block is $YC_oC_g$. For an eight-pixel block, the SAD can be calculated for each component according to Equation (2), $$SAD(\bullet) = \Sigma_{i=0}^{7} |X_i - X_{i-1}| \quad (2)$$

where $X_i$ represents pixel i of the current component in the current block. For i=0, the last reconstructed pixel of a previous block can be used for $X_{i-1}$. If i=0 and the current block is the first block in the image data, then a fixed predictor may be used for $X_{i-1}$.

Based on the result of the decision module 315, the color space determination module can set the CSC to RGB at the RGB set module 320 or can set the CSC to $YC_oC_g$ at the $YC_oC_g$ set module 325. The RGB set module 320 can output the SAD calculated for each of the R, G, and B components to the component classification module 330, and the $YC_oC_g$ set module 325 can output the SAD calculated for each of the Y, $C_o$, and $C_g$ components to the component classification module 330. Set modules 320, 325 can also output an indication for possible use in an encoded bitstream of the block regarding the color space of the block.

Component classification module 330 can determine whether each of the components of the image block is a smooth component, a variant component, or an unclassified component in the illustrated example by comparing each component SAD to a high threshold and a low threshold. Module 335 can receive the component SAD values from the color space determination module 310 and can output the SAD values for comparison to the thresholds until the module 355 determines that all components have been compared to the thresholds. In one implementation, the high and low thresholds referenced in FIG. 1 are set to $\tau_{high}=128$, $\tau_{low}=1$, respectively. A component will be classified as a variant component if the SAD for that component exceeds $\tau_{high}$. A component will be classified as a smooth component if the SAD for that component is below $\tau_{low}$. Components having an SAD greater than $\tau_{low}$ but less than $\tau_{high}$, inclusive, will not be classified. Accordingly, each component SAD value is compared at decision module 340 to the low threshold. If the SAD is less than the low threshold $\tau_{low}$, then tally module 345 adds one to the number of smooth components, COMPS_SMALL_VAR. This can be stored as part of component classification data, for example in a frame buffer. If the SAD is greater than the low threshold, then the SAD is compared to the high threshold at decision module 350. If the SAD is greater than the high threshold $\tau_{high}$, then tally module 355 adds one to the number of variant components, COMPS_LARGE_VAR. The component classification module 330 can then update the count of smooth and variant components in the component classification data. If decision module 350 determines that the SAD is not greater than the high threshold, then the component classification module 330 may not update the component classification data.

After all components have been compared to the low and high thresholds, the component classification data indicating the number of smooth components, COMPS_SMALL_VAR, and variant components, COMPS_LARGE_VAR, are output to the mixed mode decision module 395. At decision module 360, the mixed mode decision module 395 determines whether the value of COMPS_SMALL_VAR is greater than zero. This indicates whether any smooth component is present in the block. If no smooth component is present, then the mixed mode decision module 395 disables mixed mode compression for the current block at disable module 365. In this implementation, blocks having no smooth component are not suitable for mixed mode compression. Disable module 365 can cause output of the block image data for a more suitable means of compression.

If at least one smooth component is determined to be present at decision module 360, then mixed mode decision module 395 determines at decision module 370 whether the sum of the number of COMPS_SMALL_VAR and COMPS_LARGE_VAR is equal to 3 in the current example, in other examples a different threshold may be used. Because each of the RGB and $YC_oC_g$ color spaces has three components, this step determines whether any of the block components were unclassified, that is having an SAD between the low and high thresholds. This type of block is also unsuitable for mixed mode compression in the present example. If no component was unclassified, then the mixed mode decision module 395 enables mixed mode compression for the current block at enable module 375. Accordingly, in the example of blocks having three components, the following component breakdowns indicate that the block is suitable for mixed mode compression: one smooth component and two variant components, two smooth components and one variant component, and three smooth components. Enable module 375 can also provide an indication for use in an encoded bitstream that mixed mode compression was used for the block.

If mixed mode compression is enabled, then the component classification data can be sent to the coding parameter module 399. At decision block 380, coding parameter module 399 can determine a number of variant components in the component classification data. If the number of variant components COMP_LARGE_VAR is greater than one, then quantization parameter set module 385 can set a quantization parameter to QP=0. If the number of variant components COMP LARGE VAR is one or less, then quantization parameter set module 385 can set a quantization parameter to QP=1. The quantization parameter can be used by a coding module, such as mixed mode compression unit 130, to encode any variant component or components using direct quantization, as described above with respect to FIG. 1. After completion of the block analysis with a determination of mixed mode enabled, the channel analyzer 300 can output some or all of the block pixel values, color space determination, component classification data, mixed mode enable decision, and quantization parameter value to a coding module for generating a compressed bitstream of the block.

Overview of Example Encoding Format

Figure 4:
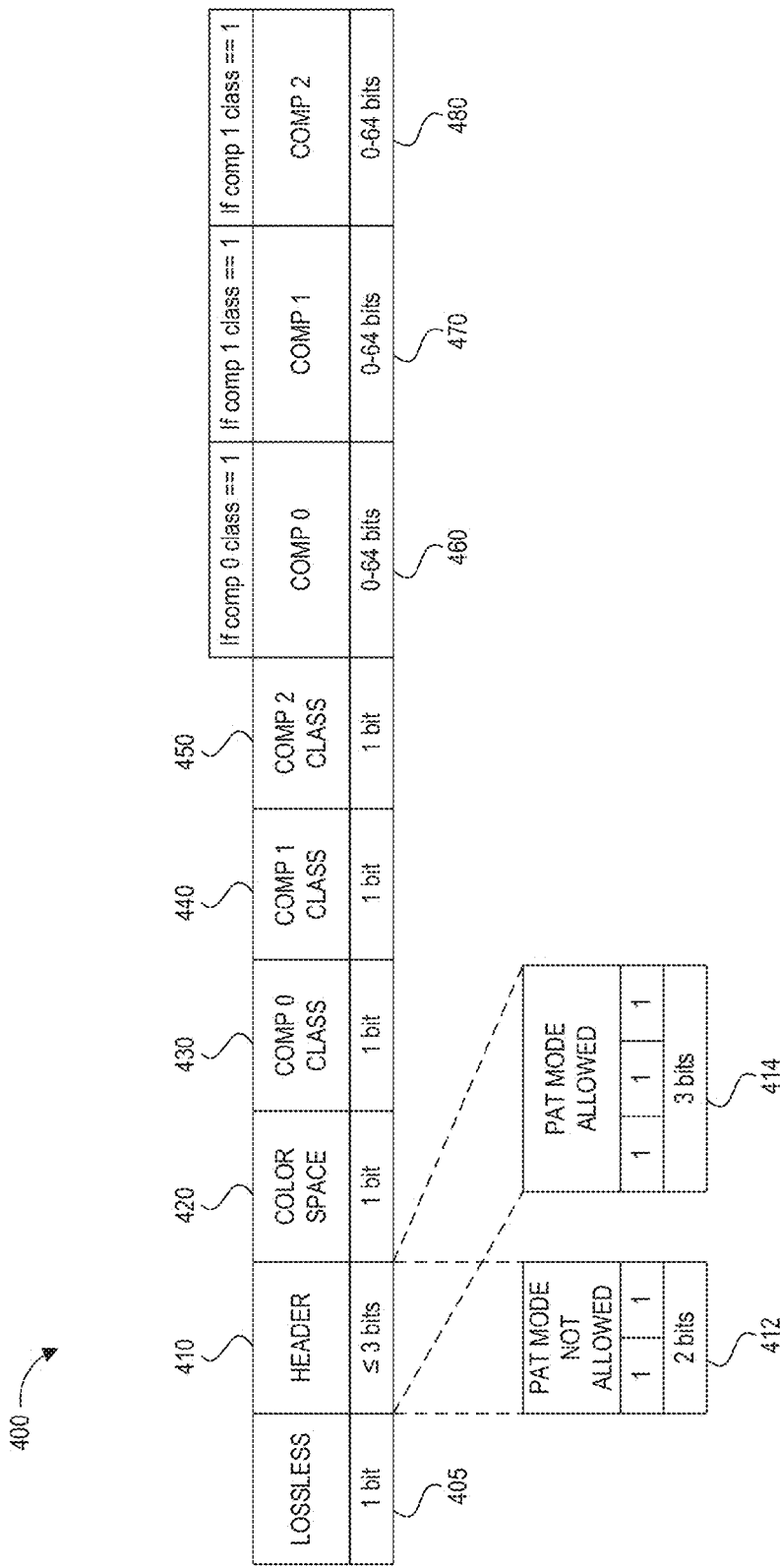
FIG. 4 illustrates an example encoding format that can be generated by the mixed mode compression scheme.

FIG. 4 illustrates an example encoding format 400 for a bitstream that can be generated by the mixed mode compression scheme described herein. The format 400 can include some or all of a lossless indicating field 405, header 410, color space indicating field 420, a plurality of component classification fields 430, 440, 450, and a plurality of coded component fields 460, 470, 480. Although the various fields are shown in a particular order, this is for illustrative purposes and the fields could be rearranged in other examples. In certain compressed bitstreams only some illustrated fields may be included and some may be omitted.

In the illustrated example, the 1-bit lossless indicating field 405 can indicate whether the bitstream was compressed in a lossless or lossy manner. In other examples, only lossless compression may be used or only lossy compression may be used, and accordingly the lossless indicating field 505 can be omitted in such examples The header 410 can be configured as required by the overall encoder/decoder design and can include up to 3 bits of information in certain embodiments. For example, in one embodiment the header 410 can include two bits 412 to indicate that a pattern mode compression was disabled or three bits 414 to indicate that pattern mode compression was enabled. Other embodiments of the header 410 can include fewer or greater bits as required by the system design. To illustrate, mixed mode compression can be one option available in a codec having multiple options for compression of image data. The header 510 can be configured to indicate to a decoder which compression mode was used to generate the bitstream. Accordingly, the syntax of the header 410 can depend on how many different modes are available in the codec.

The color space indicating field 420 can include a 1-bit representation of whether the color space is RGB or $YC_oC_g$ in the illustrated embodiment. In embodiments adapted to accommodate a wider range of color spaces, the color space indicating field 420 can be 2-bit or larger.

The bitstream can include a number of component classification fields 430, 440, 450 corresponding to the number of components in the block. In the examples discussed herein, blocks each have three components corresponding to the channels of the RGB or $YC_oC_g$ color spaces, however greater or fewer components can be used in other examples. Because the components of a block selected for mixed mode encoding in the illustrated embodiment will be either smooth or variant, a 1-bit field is used to indicate the classification of each component. In other embodiments, more component classifications may be possible and the component classification fields 430, 440, 450 can use more than 1 bit to indicate the classification.

The bitstream can also include a plurality of coded component fields 460, 470, 480 corresponding to each component in the block. In some embodiments, a coded component field can include a value for each pixel in the block. Pixel values for some or all components may be included in the bitstream based on the component classification. The size of each coded component field can range from 0 to 64 bits for an eight-pixel block.

The following example illustrates one embodiment of a bitstream length for an 8×1 block having two smooth components and one variant component, the bitstream coded according to the example encoding format 400. The header length can be 4 bits including the lossless or lossy 1-bit indicator and a 3-bit header indicating that pattern mode compression was used. Three component classification fields, each 1-bit, can indicate that there are two smooth components and one variant component, adding an additional 3 bits to the bitstream. Pixel values for the variant component can be included in one coded component field, and each pixel value corresponding to the variant component can be coded using 9 bits, adding an additional 72 bits to the bitstream. Accordingly, the example block having one new pattern and with slope mode not selected can be coded using a total of 80 bits.

As another example, an 8×1 pixel block having one smooth component and two variant components can be coded according to the example encoding format 400. The header length can be 4 bits including the lossless or lossy 1-bit indicator and a 3-bit header indicating that pattern mode compression was used. Three component classification fields, each 1-bit, can indicate that there are two variant components and one smooth component, adding an additional 3 bits to the bitstream. Pixel values for the first variant component can be included in one coded component field, and each pixel value corresponding to the variant component can be coded using 7 bits, adding an additional 56 bits to the bitstream. Pixel values for the second variant component can be included in one coded component field, and each pixel value corresponding to the variant component can be coded using 8 bits, adding an additional 64 bits to the bitstream. Accordingly, the example block having one new pattern and with slope mode not selected can be coded using a total of 128 bits. In some embodiments, a decoding module (not illustrated) can be provided to decode a bitstream coded according to the example encoding format 400 in order to recover the pixel values (or approximations of the pixel values) of the original block.

Overview of Example Mixed Mode Compression Process

Figure 5:
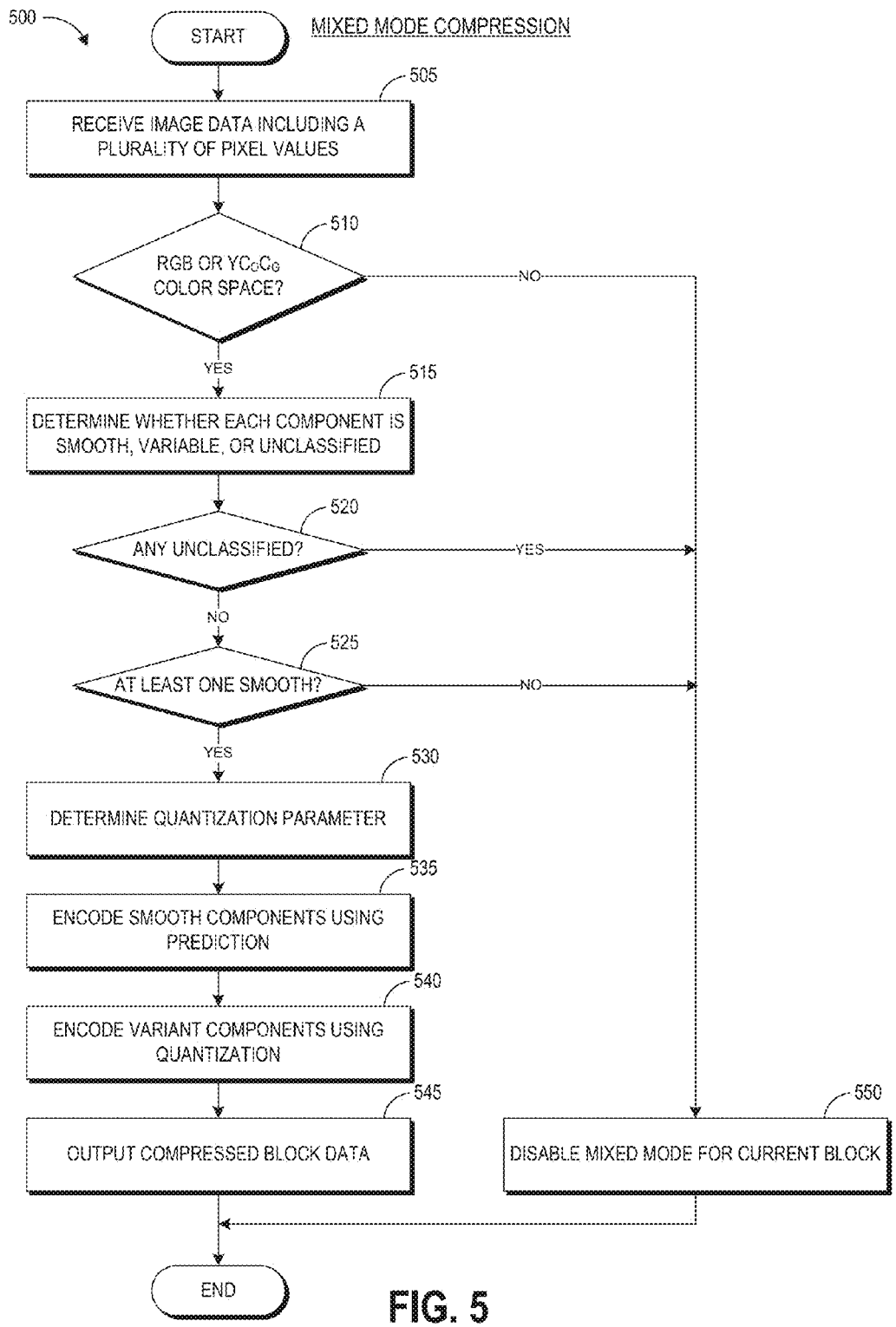
FIG. 5 illustrates an embodiment of an example mixed mode compression process.

FIG. 5 illustrates an embodiment of an example mixed mode compression process 500. For purposes of illustration, the process 500 is discussed as being implemented by the components and modules of FIG. 1 and FIG. 4. However, the process 500 can also be implemented by the compression unit 215 of FIGS. 2A-2C and by any system with the mixed mode compression capabilities as described herein.

At block 505, the mixed mode compressor 110 can receive image data. In some embodiments the image data may be segmented into a plurality of blocks, and in other embodiments the mixed mode compressor 110 may segment the data into blocks. At block 510, the mixed mode compressor 110 can determine whether the block is in the RGB or $YC_oC_g$ color space, as discussed above with respect to the color determination module 310 of FIG. 3. The color determination module 310 can use the sum of absolute differences (SAD) metric to determine whether the three components of the block are in the RGB or $YC_oC_g$ color space by adding the SAD of each component in both the RGB and $YC_oC_g$ color spaces. If the SAD sum of the R, G, and B components is less than the SAD sum of the Y, $C_o$, and $C_g$ components then the color space of the block is RGB. If the SAD sum of the R, G, and B components is equal to or greater than the SAD sum of the Y, $C_o$, and $C_g$ components then the color space of the block is $YC_oC_g$. In some embodiments, if the color space is determined to not be one of RGB and $YC_oC_g$, then the process 600 can transition to block 550 to disable mixed mode for the current block. Although not illustrated, the process 500 can output the data for a different type of compression more suited to the contents of the block.

At block 515, the component classification module 330 can determine whether each RGB or $YC_oC_g$ component is smooth, variable, or unclassified. For example, as discussed above in more detail with respect to FIG. 3, the component classification module 330 can compare the SAD value for each component to a low threshold and a high threshold. A component can be classified as a variant component if the SAD for that component exceeds the high threshold. A component can be classified as a smooth component if the SAD for that component is below the low threshold. Components having an SAD between the values of the low and high thresholds will not be classified.

At block 520, the mixed mode decision module 395 can determine whether any component was unclassified, as discussed above in more detail with respect to FIG. 3. If any component was unclassified then the process 600 can transition to block 550 to disable mixed mode for the current block. If all components were classified, then the process 600 can transition to block 525 to determine whether the block included at least one smooth component. If the block includes no smooth component, then the process 600 can transition to block 550 to disable mixed mode for the current block. If the block includes at least one smooth component, then mixed mode is enabled and the process 600 can transition to bloc 530 to determine a quantization parameter for encoding any variant component, as discussed above in more detail with respect to the coding parameter module 399 FIG. 3.

At block 535, the mixed mode compression unit 130 can encode smooth components using predictive coding techniques such as skip mode or differential pulse-code modulation. Other predictive coding techniques or other compression techniques suitable for reducing bitstream length for low varying components can be used for smooth components in other embodiments. At block 540, the mixed mode compression unit 130 can encode variant components using quantization in some embodiments. Other compression techniques suitable for reducing bitstream length for highly varying components can be used in other embodiments. At block 545, the process 500 can output the compressed block data, for example in the encoding format discussed above with respect to FIG. 4.

Example Visual Quality Results

Figure 6:
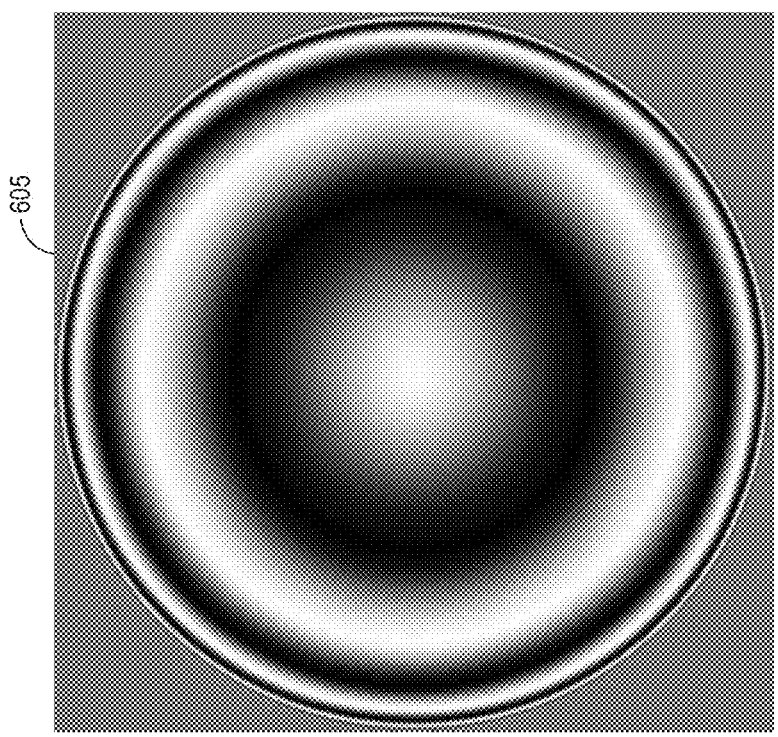
FIG. 6 illustrates a comparison of a first test pattern not generated by a mixed mode compression process and a second test pattern generated by the mixed mode compression process.
Figure 6:
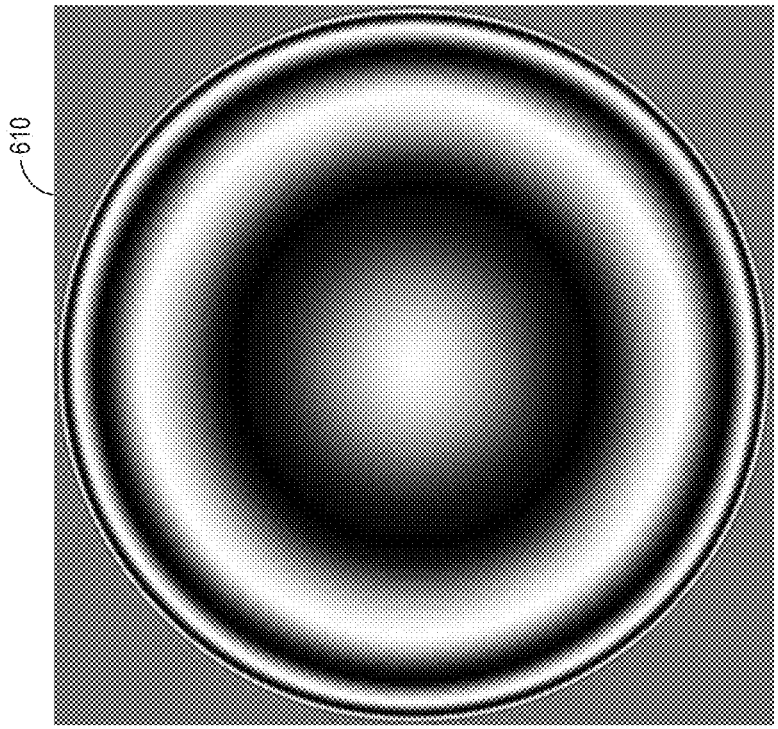

FIG. 6 illustrates a comparison of a first black and white test pattern 605 not generated by a mixed mode compression process and a second black and white test pattern 610 generated by the mixed mode compression process. Test pattern 605 was generated with mixed mode disabled and has a peak signal-to-noise ratio (PSNR) of approximately 47.485 dB. Test pattern 610 was generated with mixed mode enabled and has a PSNR of approximately 61.638 dB. PSNR is a traditional objective metric for evaluating quality of a processed image, representing ratio between the peak signal-to-noise of the original image and the peak signal-to-noise of the image after being processed by an image processing system. The higher the PSNR value, the better the quality of the compressed or reconstructed image. Therefore, the test pattern 610 generated with mixed mode enabled has an objectively higher visual quality than the test pattern 605 generated with mixed mode disabled, according to the PSNR metric.

Figure 7:
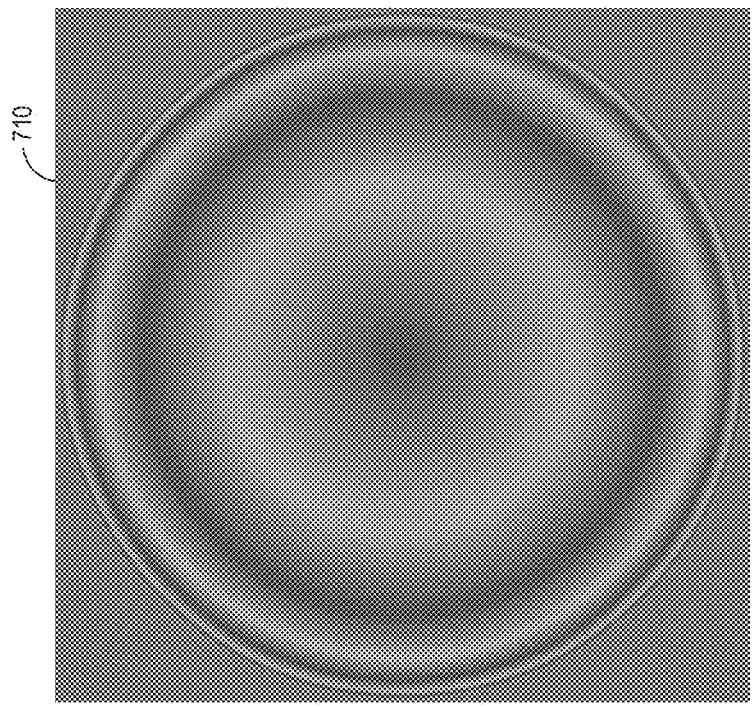
FIG. 7 illustrates another comparison of a first test pattern not generated by a mixed mode compression process and a second test pattern generated by the mixed mode compression process.
Figure 7:
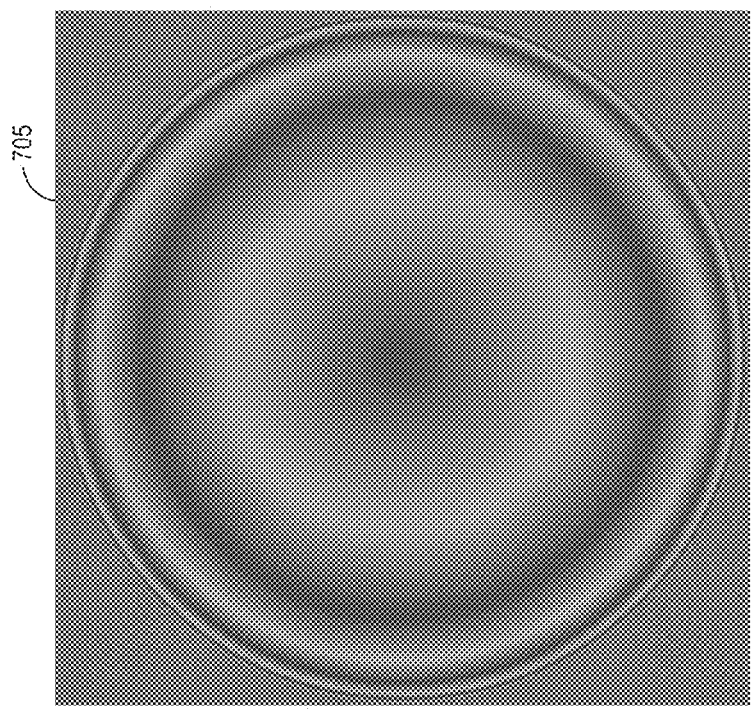

FIG. 7 illustrates grayscale approximations of a first color test pattern 705 not generated by a mixed mode compression process and a second color test pattern 710 generated by the mixed mode compression process. Test pattern 705 has a PSNR of approximately 23.382 dB and test pattern 710 has a PSNR of approximately 37.435 dB, and therefore test pattern 710 has an objectively higher visual quality than test pattern 705. In addition, the subjective, or perceived, visual quality difference between test patterns 705 and 710 is also apparent by noting the artifacts and discoloration present in test pattern 705 that are not present in test pattern 710, particularly in the corner regions.

Implementing Systems and Terminology

Implementations disclosed herein provide systems, methods and apparatus for compressing image data. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the CNR process discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system in an electronic device for compressing image data, the system comprising:
    a channel analysis module configured to
        receive a pixel block comprising a plurality of components, at least some of the plurality of components corresponding to a color channel of the pixel block;
        determine whether the pixel block is a mixed block by comparing values associated with each of the plurality of components to at least one threshold and assigning a classification of either smooth or variant to at least some of the plurality of components based on the at least one threshold, a mixed block being a pixel block having:
            at least one component assigned the smooth classification, and
            each other component of the plurality of components in the mixed block assigned the classification of either smooth or variant; and
    a mixed mode compression module configured to compress the pixel block using mixed encoding based at least partly on the assigned component classifications.

2. The system of claim 1, wherein the values associated with each of the plurality of components are sum of absolute difference values indicating a level of color variance of the component.

3. The system of claim 1, wherein the channel analysis module does not assign the classification of smooth or variant to a component if the value associated with the component is between a low threshold and a high threshold.

4. The system of claim 1, wherein the mixed block further comprises at least one component assigned the variant classification.

5. The system of claim 4, wherein the mixed mode compression module implements different compression modes for the at least one component assigned the smooth classification and the at least one component assigned the variant classification.

6. The system of claim 5, wherein the mixed mode compression module implements pulse code modulation to code the at least one component assigned the variant classification.

7. The system of claim 5, wherein the mixed mode compression module implements prediction to code the at least one component assigned the smooth classification.

8. The system of claim 1, wherein a bitstream coded by mixed encoding comprises a first bit representing a color space of the pixel block, a plurality of subsequent bits representing the classification of each of the plurality of components, and at least one coded component field including the coded bitstream of a corresponding one of the plurality of components.

9. The system of claim 8, wherein the at least one coded component field corresponds to the at least one component assigned the variant classification.

10. The system of claim 8, wherein the at least one coded component field includes a value of each of a plurality of pixels in the pixel block.

11. The system of claim 8, the mixed block having two components assigned the classification of variant, the bitstream comprising two coded component fields corresponding to the two components assigned the classification of variant.

12. The system of claim 1, further comprising a mixed mode decision module configured to enable mixed mode compression if the pixel block is a mixed block.

13. The system of claim 1, further comprising a mixed mode decision module configured to disable mixed mode compression if the pixel block is not a mixed block.

14. The system of claim 1, further comprising a coding parameter module configured to set a quantization parameter based on a number of components assigned the classification of variant.

15. A method for compressing image data in an electronic device, the method comprising:
    receiving a pixel block comprising a plurality of components, at least some of the plurality of components corresponding to a color channel of the pixel block;
    comparing values associated with each of the plurality of components to at least one of a high threshold and a low threshold to determine a level of color variance in each of the plurality of components;
    assigning a classification of smooth to at least one smooth component of the plurality of components, the value associated with the at least one smooth component being less than the low threshold;
    assigning a classification of variant to at least one variant component of the plurality of components; the value of associated with the at least one variant component being higher than the high threshold; and
    determining whether the pixel block is a mixed block based on the assigned classifications.

16. The method of claim 15, further comprising compressing the pixel block using mixed encoding based at least partly on the assigned component classifications.

17. The method of claim 15, wherein the values associated with each of the plurality of components are sum of absolute difference values indicating a level of color variance of the component.

18. The method of claim 17, further comprising calculating the sum of absolute difference values for each of the plurality of components.

19. The method of claim 17, further comprising determining a color space of the pixel block based at least partly on the sum of absolute difference values.

20. The method of claim 15, further comprising implementing different compression modes for the at least one component assigned the smooth classification and the at least one component assigned the variant classification.

21. The method of claim 20, further comprising coding the at least one variant component using prediction.

22. The method of claim 20, further comprising coding the at least one smooth component using pulse code modulation.

23. An apparatus for compressing image data in an electronic device, the apparatus comprising:
    means for determining level of color variance in each of a plurality of components of a pixel block by comparing values associated with each of the plurality of components to at least one of a high threshold and a low threshold;
    means for assigning a classification of smooth to at least one smooth component of the plurality of components and assigning a classification of variant to at least one variant component, the value associated with the at least one smooth component being less than the low threshold and the value associated with the at least one variant component being greater than the high threshold; and
    means for determining whether the pixel block is a mixed block based on the assigned classifications.

24. The apparatus of claim 23, further comprising means for implementing different compression modes for at least one component assigned the smooth classification and at least one component assigned the variant classification.

25. The apparatus of claim 23, further comprising means for calculating sum of absolute difference values for each of the plurality of components.

26. The apparatus of claim 23, further comprising means for determining a color space of the pixel block.

27. The apparatus of claim 23, further comprising means for setting set a quantization parameter based on a number of components assigned the classification of variant.

28. A non-transitory computer-readable medium storing instructions that, when executed, cause at least one physical computer processor to perform a method of compressing image data, the method comprising:
    determining level of color variance in each of a plurality of components of a pixel block by comparing values associated with each of the plurality of components to at least one of a high threshold and a low threshold;
    assigning a classification of either smooth or variant to at least some of the plurality of components based on the compared values;
    determining whether the pixel block is a mixed block based on the assigned classifications; and
    implementing different compression modes for at least one component assigned the smooth classification and at least one component assigned the variant classification.

29. The non-transitory computer-readable medium of claim 28, further comprising coding the at least one component assigned the variant classification using prediction.

30. The non-transitory computer-readable medium of claim 28, further comprising coding the at least one component assigned the smooth classification using pulse code modulation.

* * * * *